Patented June 16, 1953

2,642,401

UNITED STATES PATENT OFFICE 2,642,401

CATALYST RECOVERY

Henry E. Laurey, Berkeley, Calif., assignor to California Research Corporation, San Francisco, Calif., a corporation of Delaware No Drawing. Application February 15, 1949, Serial No. 76,649

7 Claims. (Cl. 252—413)

This invention relates to an improved method of recovering components of spent catalyst, and more particularly, to the recovery of molybdenum and aluminum from molybdena-alumina catalysts which have become spent in the course of prolonged use.

Catalysts composed of molybdena and alumina are used in catalytic reforming and dehydrogenation processes. A cyclic operation is generally utilized in such processes. In this manner of operation the catalyst is contacted with the feed stock until the conversion decreases to a predetermined level, and then the catalyst is regenerated by burning the accumulated coke from the catalyst with an oxygen-containing gas. As this cyclic operation is continued, the activity of the catalyst gradually declines. A point is finally reached at which the conversion of the feed to the desired product becomes insufficient. The spent catalyst is then removed from the conversion zone of the process and is commonly discarded because of the difficulty of making an economical recovery of the molybdenum and aluminum. Impurities accumulate on and in the catalyst to make such recovery difficult. Among the impurities which interfere with molybdenum and aluminum recovery is iron oxide. As little as 0.5% iron oxide in the finished catalyst has been found to be seriously detrimental to catalytic activity. The iron oxide contained in spent catalyst is believed to come from the walls, pipes, etc. of the process equipment and it is apparently intimately mixed with, and adherent to, the catalyst, which eliminates the possibility of separating it from the catalyst by physical means.

Several methods have been proposed for the recovery of molybdenum from spent molybdenum-containing catalysts, but they are not commercially practiced. These proposed methods generally call for the recovery of complex molybdenum compounds in dilute solutions. Further processing is required to make the molybdenum available in a useful form.

It is an object of this invention to provide a method of recovering molybdenum and aluminum from spent molybdena-alumina catalysts.

It is another object of this invention to recover molybdenum and aluminum from spent molybdena-alumina catalysts by a method in which simple aluminum and molybdenum compounds are recovered at high concentrations.

It has been discovered that mixtures of metallic oxides consisting essentially of at least two oxides selected from the group consisting of iron oxide, molybdenum oxide and aluminum oxide may be separated by a method which comprises digesting the mixture with concentrated hydrochloric acid to dissolve the mixture, extracting the acid solution with a solvent consisting essentially of an alcohol containing 4-9 carbon atoms per molecule and a hydrocarbon liquid, separating a solvent phase and an acid phase, extracting the solvent phase with water, and separating an aqueous phase and a solvent phase.

The following example illustrates the process of the invention:

A molybdena-alumina catalyst which had become spent in the course of its use in a process for the catalytic reforming of naphtha was treated to recover molybedum and aluminum.

A sample of this spent catalyst analyzing 93.05% $Al_2O_3$, 6.23% $MoO_3$, and 0.72% $Fe_2O_3$ and weighing 1140 grams was ground and then digested with 11,250 grams of 32% hydrochloric acid. To reduce the loss of acid vapor, the acid was added at intervals during a period of 24 hours and the digestion was conducted under reflux condensers. After digestion, the dissolved portion of the catalyst was separated from the undissolved portion by vacuum filtration. The filtrate had a volume of 9.15 liters. The undissolved residue was dried and found to weigh 60 grams. To insure oxidation of the dissolved molybdenum and iron, 2.9 grams of chlorine were added to the filtrate and the solution was allowed to stand for 15 minutes to give adequate time for the oxidation in order to facilitate separation of iron and molybdenum from aluminum in the subsequent solvent-extraction step. The solution was then boiled to drive off excess chlorine.

Upon cooling, the solution was split into four equal volumes and each volume was treated in a first extraction step with 2500 cc. of a solvent containing 20% by volume pentasol and 80% by volume of a petroleum hydrocarbon boiling between 309° and 390° F. and containing about 13% paraffins, 70% naphthenes, and 17% aromatics as determined by A. S. T. M. test D 875-46T. A solvent phase containing the extracted molybdenum and the iron and an acid phase containing the aluminum and a minor portion of the molybdenum were separated by a separatory funnel. The solvent was then treated in a second extraction step with about 500 cc. of water, and an aqueous phase and a solvent phase were formed. The aqueous phase, containing the extracted molybdenum and iron chlorides, was separated from the solvent phase by a separatory funnel, and the solvent was stored for re-use.

The aqueous phases recovered in the second extraction step from each of the four volumes above mentioned were combined, and had a total volume of 1.79 liters. The acid phases were recovered in the first extraction step and were also combined.

Iron and the small amount of aluminum in the 1.79 liters of combined aqueous phases were precipitated by adding 328 cc. of 28% ammonia. Then 18 grams of chlorine were bubbled into the solution to insure the highest valence level of molybdenum and iron in order that separation of the metals will occur upon addition of ammonia in the subsequent step. The pH of this solution was raised to above 8 by an additional 20 cc. of 28% ammonia solution. The precipitate was separated from the solution by filtration, washed, and then filtrate and washings were combined. The precipitate was weighed and found to weigh 44 grams. Analysis of the filtrate and washings shows that it contained 72.5% of the molybdenum of the original sample. The combined acid phases from the first extraction step in the process were found to contain 13.2% of the $MoO_3$ of the original sample, and 92% of $Al_2O_3$.

In the above example, the solvent consisted of a 20% by weight pentasol—80% by weight petroleum hydrocarbon mixture, and was found to be satisfactory for the first extraction step. However, it has been found that the percentage of the alcoholic and hydrocarbon components in the solvent mixture may be varied over a wide range, depending upon the material being separated and the completeness of the separation desired. The amount of alcohol in the solvent has been found to exert a controlling influence on the capacity of the solvent to extract iron and molybdenum from the acid solution. The alcohol content of the alcohol-hydrocarbon solvent should not be less than 3% by volume and is preferably within the range of 10 to 30% by volume. Occasionally a high alcohol content, such as about 60%, by volume may also be employed. The alcohol should be relatively insoluble in water and non-reactive with the hydrochloric acid phase. It is generally preferred to use about one volume of solvent to five volumes of acid solution in the first extraction step. However, in certain instances, this ratio may be larger or smaller. For example, a 1:1 ratio of acid solution to solvent was found to be effective in the example given above. The ratio usually depends on the molybdenum and iron content of the spent catalyst. Although it is generally preferred to employ a solvent containing a mixture of an alcohol and hydrocarbon, I have found that an alcohol containing 4-9 carbon atoms per molecule, may be used alone as a solvent. When an alcohol alone is used as the solvent, appreciable consumption of this solvent may occur during the aqueous extraction of the solvent phase. On the other hand, when the solvent contains a sufficient amount of a hydrocarbon, very little solvent consumption is encountered. This is probably due to the preferential solubility of the alcohol in the hydrocarbon over the solubility of the alcohol in water.

While pentasol was used in the example given above, it has been found that other alcohols relatively insoluble in water may be employed as the alcoholic components of the solvent. It has been found that as the length of the carbon chain of the alcohol molecule increases, the capacity of the alcohol to extract iron and molybdenum from the acid solution decreases. The shorter carbon chain alcohol molecules are quite water soluble and thus are not suitable as a component of the solvent. Accordingly, the alcohols having 4-5 carbon atoms per molecule are preferred. The isomers of these alcohols are generally equally effective. Although it is preferred to employ alcohols having 4-5 carbon atoms in the molecule, alcohols having 4-9 carbon atoms may be employed as the alcoholic component of the solvent.

When mixtures containing high concentrations of alumina and iron oxide are treated according to the process of this invention, several stages of extraction of the acid solution with the alcohol-hydrocarbon solvent may be desirable in order to effect separation of the two metals. The process of this invention may be employed in aluminum-refining processes when it is desired to separate aluminum from iron. In such a process, the hydrochloric acid-digested mixture may be subjected to several extractions with the alcohol-hydrocarbon solvent, the number of the extractions depending upon the concentration of the iron. The solvent is then extracted with water to remove the extracted iron, and then re-used for extracting further amounts of iron from the acid solution.

The petroleum hydrocarbon fraction of the solvent, it has been found, should be miscible with the alcoholic component, non-reactive with the hydrochloric acid phase, have a low viscosity, and have a boiling range within the limits of about 150° and about 450° F. Preferably the petroleum fraction should be a catalytically reformed naphtha. However, relatively pure or mixed aromatics such as benzene, toluene or xylenes may be used as the hydrocarbon component of the solvent. However, petroleum fractions predominantly naphthenic or paraffinic may likewise be employed.

As illustrated in the example given above, the solvent may be recycled. This feature gives rise to relatively low operating costs for the process of the invention. In the process of this invention, the solvent is recovered in condition for re-use as a matter of course during the second extraction step, in which it is treated with water to remove the chlorides, and then subjected to a simple phase separation step to recover the solvent in a relatively pure condition.

It is preferred to conduct the process of this invention at approximately room temperature, however the process may be conducted at slightly higher or lower temperatures.

A catalyst suitable for hydroforming, catalytic reforming, or dehydrogenation, for example, may be prepared from the products of the process of this invention by coprecipitating these products according to the process disclosed in U. S. Patent 2,432,286 to Claussen et al. According to this patent $AlCl_3$ is slowly added to an alkaline solution of ammonium molybdate having a relatively high pH value until the pH value of this solution is brought within the range of about 7.25 to about 8.0. The addition of aluminum chloride and the change in pH value causes coprecipitation of alumina and molybdena. The coprecipitate is then filtered, washed, dried, and compressed into pellets to form a molybdena-alumina catalyst. In many instances it may be desirable to add further amounts of either aluminum or molybdenum compounds, or both, to the solutions before the coprecipitation step, in order to obtain a catalyst containing the desired amounts of alumina and molybdena. Also, it is found expedient to remove excessive amounts of hydrochloric acid in the acid phase by vacuum distillation, for example, in order to avoid using large amounts of ammonia and to avoid formation of excessive amounts of ammonium chloride.

It is not intended to limit this invention to the illustrative example given above but rather to extend it to such modifications within the skill of the art as are within the scope of the appended claims.

I claim:

1. A method of separating a mixture of metallic oxides comprising iron oxide, molybdenum oxide, and aluminum oxide, which comprises digesting the mixture with concentrated hydrochloric acid under oxidizing conditions to dissolve the mixture and yield high valent forms of said metals, extracting the resulting acid solution with a solvent consisting essentially of an alcohol containing 4–9 carbon atoms per molecule and a hydrocarbon liquid boiling within the range of about 150° F. to about 450° F., separating a solvent phase and recovering an acid phase containing a substantial proportion of said aluminum and a minor proportion of said molybdenum, extracting the solvent phase with water, separating an aqueous phase containing a major portion of the molybdenum and a minor portion of the aluminum and iron, and a solvent phase, adding ammonia under oxidizing conditions to the separated aqueous phase in sufficient quantity to raise the pH value to above 8 and to maintain high valent forms of metal in said aqueous phase whereby iron and aluminum are precipitated, and filtering said precipitated aqueous phase to separate and recover said precipitate and obtain thereby recovery of a filtrate containing molybdenum in solution.

2. A method of separating a mixture of metallic oxides comprising iron oxide and aluminum oxide, which comprises digesting the mixture with concentrated hydrochloric acid under oxidizing conditions to dissolve the mixture and yield high valent forms of said metals, extracting the resulting acid solution with a solvent consisting essentially of an alcohol containing 4–9 carbon atoms per molecule and a hydrocarbon liquid boiling within the range of about 150° F. to about 450° F., separating a solvent phase containing iron and an acid phase containing recoverable aluminum, extracting the solvent phase with water, and separating and recovering an aqueous phase containing iron and a minor portion of the aluminum and a solvent phase containing said solvent.

3. A method of separating a mixture of metallic oxides comprising molybdenum oxide and aluminum oxide, which comprises digesting the mixture with concentrated hydrochloric acid under oxidizing conditions to dissolve a substantial portion of the mixture and yield high valent forms of said metals, extracting the resulting acid solution with a solvent consisting essentially of an alcohol containing 4–9 carbon atoms per molecule and a hydrocarbon liquid containing recoverable aluminum and molybdenum, separating a solvent phase and an acid phase boiling within the range of about 150° F. to about 450° F., extracting the solvent phase with water, separating an aqueous phase containing a major portion of the molybdenum and a minor portion of the aluminum, adding ammonia to the separated aqueous phase in a quantity sufficient to raise the pH value to above 8 whereby the aluminum is precipitated, and filtering said precipitated aqueous phase to separate and recover said precipitate containing said aluminum and a filtrate containing molybdenum in solution.

4. A process as described in claim 1, wherein the mixture of metallic oxides is a spent molybdena-alumina reforming catalyst containing iron as an impurity.

5. A process as described in claim 3, wherein the mixture of metallic oxides is a spent molybdena-alumina reforming catalyst.

6. A process as described in claim 3, wherein the solvent consists of 20% by volume of an alcohol and 80% of a hydrocarbon liquid boiling within the range of about 150° F. to about 450° F.

7. A process for preparing molybdena-alumina catalysts from spent molybdena-alumina catalysts which comprises digesting the spent catalysts with concentrated hydrochloric acid to dissolve the spent catalyst, oxidizing the dissolved catalyst with chlorine, extracting the acid solution with a solvent consisting essentially of an alcohol containing 4–9 carbon atoms per molecule and a liquid hydrocarbon, separating a solvent phase and an acid phase, extracting the solvent phase with water, separating an aqueous phase and a solvent phase, adding ammonia to the separated aqueous phase, oxidizing the ammoniacal aqueous phase with chlorine, adjusting the pH value of the oxidized aqueous phase to above 8 by adding further amounts of ammonia whereby iron and aluminum are precipitated, filtering said precipitated aqueous phase to separate said precipitate and obtain a filtrate containing molybdenum, distilling a portion of the acid from the extracted acid phase, adding the bottoms from said distillation to the filtrate until the pH of the mixture falls to about 7.25 whereby molybdenum and aluminum are coprecipitated, separating the coprecipitate by filtration, washing and drying the coprecipitate, and compressing the dried coprecipitate into pellets.

HENRY E. LAUREY.

References Cited in the file of this patent

UNITED STATES PATENTS

| Number | Name | Date |
|---|---|---|
| 1,923,652 | Winkler et al. | Aug. 22, 1933 |
| 1,948,407 | Watts | Feb. 20, 1934 |
| 2,112,292 | Jones | Mar. 29, 1938 |
| 2,211,119 | Hixon | Aug. 13, 1940 |
| 2,227,833 | Hixon et al. | Jan. 7, 1941 |
| 2,422,372 | Smith et al. | June 17, 1947 |
| 2,432,286 | Claussen et al. | Dec. 9, 1947 |